US007786982B2

(12) United States Patent
Tamura et al.

(10) Patent No.: US 7,786,982 B2
(45) **Date of Patent: *Aug. 31, 2010**

(54) DISPLAY CONTROL DEVICE FOR TOUCH PANEL-TYPE SETTING-OPERATION UNIT, ELECTRONIC APPARATUS AND IMAGE FORMING APPARATUS

(75) Inventors: Takashi Tamura, Osaka (JP); Hiroyuki Tsuji, Osaka (JP); Toshimasa Takaoka, Osaka (JP)

(73) Assignee: Kyocera Mita Corporation (JP)

( * ) Notice: Subject to any disclaimer, the term of this patent is extended or adjusted under 35 U.S.C. 154(b) by 342 days.

This patent is subject to a terminal disclaimer.

(21) Appl. No.: 11/949,940

(22) Filed: Dec. 4, 2007

(65) Prior Publication Data

US 2008/0084580 A1 Apr. 10, 2008

Related U.S. Application Data

(62) Division of application No. 10/870,119, filed on Jun. 17, 2004, now Pat. No. 7,336,265.

(51) Int. Cl.
*G06F 3/41* (2006.01)
*G06F 3/12* (2006.01)

(52) U.S. Cl. ...................................... 345/173; 358/1.15

(58) Field of Classification Search ................. 345/156, 345/168, 173, 199, 589, 593, 594, 968; 358/1.9, 358/501; 356/419; 399/6, 8, 45, 81, 66
See application file for complete search history.

(56) References Cited

U.S. PATENT DOCUMENTS 4,459,631 A * 7/1984 McNamee ................... 361/21
4,870,447 A 9/1989 Yoshida et al.
5,105,217 A * 4/1992 Igawa ............................ 399/6
5,555,099 A * 9/1996 Telle .......................... 358/401
5,583,539 A 12/1996 Hiketa et al.
5,757,359 A 5/1998 Morimoto et al.
5,774,759 A 6/1998 Tanaka
5,880,444 A 3/1999 Shibata et al.
5,943,655 A 8/1999 Jacobson
6,285,842 B1 * 9/2001 Katamoto et al. ............. 399/81
6,297,826 B1 10/2001 Semba et al.
6,373,573 B1 * 4/2002 Jung et al. .................. 356/419

(Continued)

FOREIGN PATENT DOCUMENTS

JP 4-225673 8/1992

(Continued)

*Primary Examiner*—Prabodh M Dharia
(74) *Attorney, Agent, or Firm*—Gerald E. Hespos; Michael J. Porco

(57) ABSTRACT

Disclosed is a display control device for a touch panel-type setting-operation unit, which is designed to display a plurality of manually operable keys on a display screen and to perform an input processing corresponding to the operation of one or more of the keys. The display control device is operable, based on an evaluation value representing the operational status of each of the keys, which is derived from the relative operation number of each of the keys in a given period of time, to vary the respective display colors of the display areas for the keys in a stepwise manner using a color gradation from a color with high visibility to a color with low visibility in the order of higher score of the evaluation value.

4 Claims, 7 Drawing Sheets

U.S. PATENT DOCUMENTS

| | | | | |
|---|---|---|---|---|
| 6,477,341 | B2 | 11/2002 | Nomura et al. | |
| 6,493,461 | B1 | 12/2002 | Mennie et al. | |
| 6,535,787 | B1 | 3/2003 | Inamasu et al. | |
| 6,577,826 | B1 | 6/2003 | Misaizu et al. | |
| 6,621,919 | B2 | 9/2003 | Mennie et al. | |
| 6,636,708 | B2 | 10/2003 | Takashi | |
| 6,690,382 | B1 | 2/2004 | Tanigawa et al. | |
| 6,769,987 | B1 | 8/2004 | Morita et al. | |
| 7,187,472 | B2 * | 3/2007 | Friedman et al. | 358/1.9 |
| 7,336,265 | B2 * | 2/2008 | Tamura et al. | 345/173 |
| 2001/0028808 | A1 | 10/2001 | Nomura et al. | |
| 2003/0118228 | A1 | 6/2003 | Mennie et al. | |
| 2004/0042022 | A1 * | 3/2004 | Friedman et al. | 358/1.9 |
| 2005/0088709 | A1 | 4/2005 | Kizaki et al. | |

FOREIGN PATENT DOCUMENTS

| | | |
|---|---|---|
| JP | 11-272386 | 10/1999 |
| JP | 2002-362188 | 12/2002 |

* cited by examiner

DISPLAY CONTROL DEVICE FOR TOUCH PANEL-TYPE SETTING-OPERATION UNIT, ELECTRONIC APPARATUS AND IMAGE FORMING APPARATUS

This application is a divisional of U.S. patent application Ser. No. 10/870,119, filed Jun. 17, 2004.

BACKGROUND OF THE INVENTION

1. Field of the Invention

The present invention relates to a display control device for a touch panel-type setting-operation unit, which is designed to display a plurality of manually operable keys on a display screen and to perform an input processing corresponding to the operation of one or more of the keys. The present invention also relates to an electronic apparatus, such as an image forming apparatus, which is equipped with the display control device.

2. Description of the Related Art

Heretofore, an operation panel for copying machines or facsimile machines has been provides with a display control device for a touch panel-type setting-operation unit, which designed to display a plurality of manually operable input keys on a display screen such as liquid-crystal display or CRT display, and, in response to an operator's finger-touch on one of the keys displayed on the screen, to allow an operational instruction corresponding to the touched key to be entered therethrough.

For example, in a facsimile machine having a touch panel, there has been known one type in which a plurality of one-touch or touch-sensitive keys indicative of 20 to 30 of designation telephone numbers are displayed on the screen of the touch panel, and the screen can be switched over to register 100 or more of designation telephone numbers. The functions of the one-touch keys provide a simplified operational procedure for transmitting to a frequently used destination, and an improved operationality or usability of the facsimile machine. There has also been proposed a technique in which the number of uses of each of a plurality of destinations is counted every time a corresponding one-touch key is operated, and a higher priority is given to the destination used in a higher frequency on the basis of the counted number of uses so as to sequentially change the respective display positions of the destinations in the order of descending priorities to allow the frequently used designation to be displayed on the first one of a plurality of switchable screens of a touch panel (see Japanese Patent Laid-Open Publication No. 04-225673).

However, as in the above facsimile machine, if the respective display positions of the destinations to be displayed on the touch panel screens are sequentially changed in response to the frequency of use in the corresponding one-touch keys, there will be difficulties for a user to find the position of a key to be used, resulting in adversely deteriorated usability.

SUMMARY OF THE INVENTION

In view of the above problem, it is an object of the present invention to provide a display control device for a touch panel-type setting-operation unit, capable of displaying a plurality of keys with excellent usability while allowing a user to readily recognize the display positions of the keys.

It is another object of the present invention to provide an electronic apparatus, such as an image forming apparatus, which is equipped with the display control device.

In order to above objects, the present invention provides a display control device for a touch panel-type setting-operation unit, which is designed to display a plurality of manually operable keys on a display screen and to perform an input processing corresponding to the operation of one or more of the keys. The display control device comprises unit operable, based on an evaluation value representing the operational status of each of the keys, to vary the respective display colors of the display areas for the keys in a stepwise manner using a color gradation from a color with high visibility to a color with low visibility in order of higher score of the evaluation value.

According to this display control device, the respective display colors of the display areas for the keys are varied in a stepwise manner using a color gradation from a color with high visibility to a color with low visibility in order of higher score of the evaluation value representing the operational status of each of the keys. Thus, the recognizability of each of the keys on the display screen relative to an operator can be varied depending on the respective operational statuses of the keys. Further, the display control device of the present invention can be incorporated in an electronic apparatus, such as an image forming apparatus, which is designed to display a number of functions on a display screen. This allows even users who are inexperienced in the operation of such a number of functions to operate the electronic apparatus without difficulties.

DETAILED DESCRIPTION OF THE PREFERRED EMBODIMENTS

With reference to the drawings, a display control device for a touch panel-type setting-operation unit, according to one embodiment of the present invention will now be described in connection with one example in which the display control device is incorporated in a color copying machine.

Figure 1:
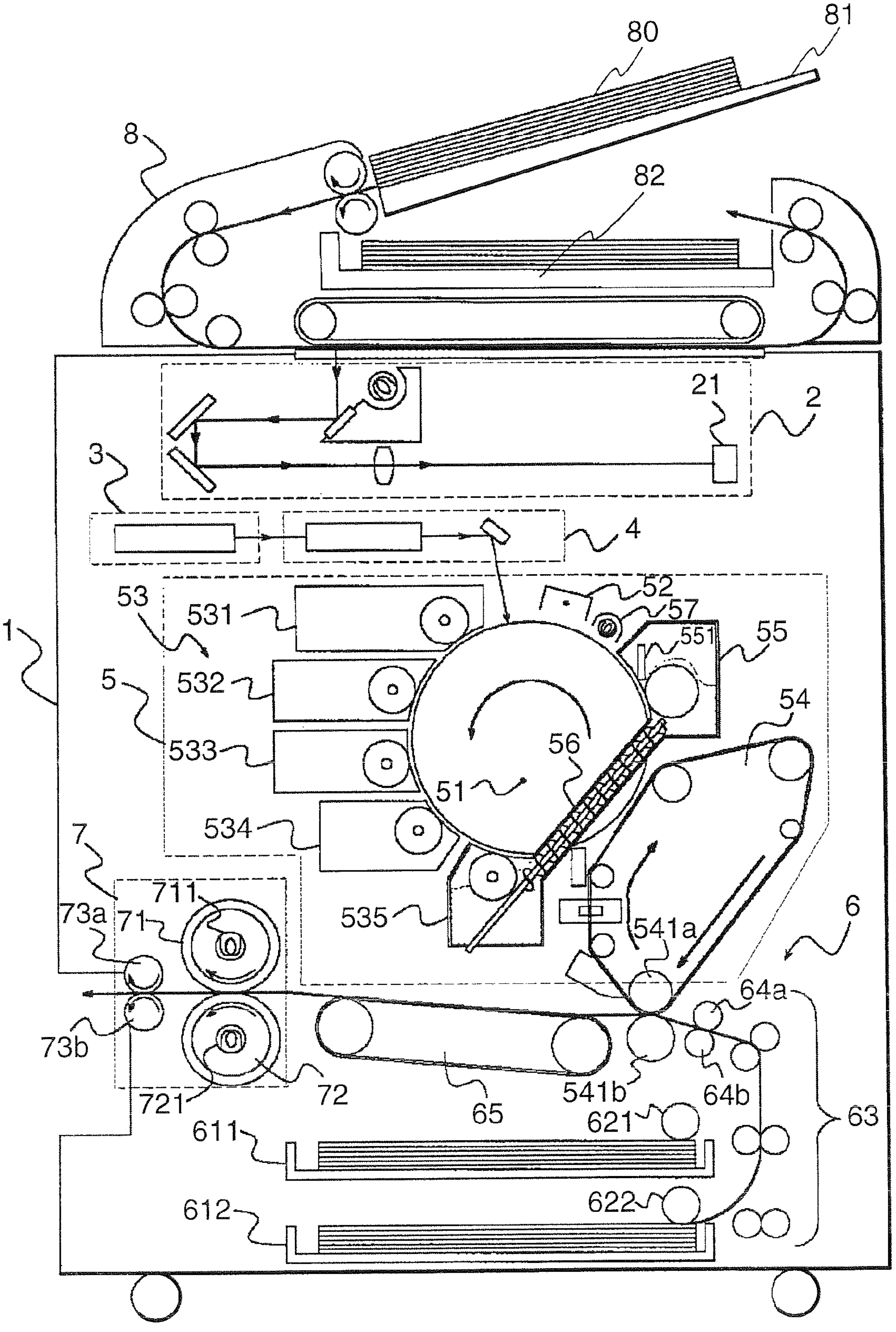
FIG. 1 is an explanatory diagram of the operation of a copying machine.

As shown in FIG. 1, a color copying machine 1 is composed of a plurality of process control sections including a scanner section 2, an image processing section 3, a laser scanner unit (LSU) 4, an image forming section 5, a sheet feeing device 6, a fixing device 7 and automatic document feeder (DF) section 8.

The DF section 8 is operable to feed a plurality of documents 80 placed on a document tray 81, one by one to a position where the fed document is read by the scanner section 2, and then discharge the document after the completion of the read operation to a discharge tray 82. The scanner section 2 is operable to emit light onto the document and send a resulting reflected light to a CCD image sensor 21 through an RGB filter set to convert the reflected light into an electrical signal in the CCD image sensor 21. The image processing section 3 is operable to subject the signal from the CCD image sensor 21, to A/D conversion, shading correction, tone correction and other image processing, so as to obtain image data. The LSU 4 is operable to convert the image data of the image processing section 3 into a laser beam and emit the laser beam onto a photosensitive drum 51.

The image forming section 5 comprises the photosensitive drum 51, a main charging device 52, a development device 53, a transfer belt 54, a cleaning device 55, a recycled-toner supply device 56 and a charge-erasing lamp 57. More specifically, the development device 53 includes five development segments: a cyan development segment 531, a magenta development segment 532, a yellow development segment 533, a black development segment 534 and a recycle development segment 535. The main charging device 52 includes a shield case having an opening facing to the photosensitive drum 51, and a thin tungsten wire of 50 to 100 μm, which is provided in the shield case to extend in the longitudinal direction of the photosensitive drum 51, and adapted to be applied with a high voltage of about +5 KV so as to allow the photosensitive drum 51 to be positively charged. The leaser beam corresponding to image information is emitted by LSU4 onto the electrostatically charged surface of the photosensitive drum 51 to form an electrostatic latent image on the surface of the photosensitive drum 51. A bias voltage of a development roller of the development device 53 and a potential of the surface of the photosensitive drum 51 act on toner stirred in the development device 53 and positively charged, to form a toner image in the area of the photosensitive drum 51 irradiated with the laser beam. The toner image is transferred onto the surface of the transfer belt 54. Any un-transferred toner on the surface of the photosensitive drum 51 is scraped off by a rubber blade 551 of the cleaning device 55, and the residual potential on the surface of the photosensitive drum 51 is erased by the charge-erasing lamp 57 to provide a uniform the potential thereon so as to make preparation for a series of subsequent processes.

In a color-image output mode, the above processes are repeatedly performed for the respective colors of cyan, magenta, yellow and black to transfer respective toner images on the transfer belt 54 in a superimposed manner, and these toner images are transferred onto a sheet by a secondary transfer section (541*a*, 541*b*).

In a monochrome-image output mode, the development is performed only using the black development segment 534 without activation of the cyan, magenta and yellow development segments 531, 532, 533. As the need arises, the development may be performed only using the recycle development segment 535.

The sheet feeing device 6 comprises a sheet feed cassette 611, 612, a sheet roller 621, 622, a vertical feed path 63, a resist roller pair 64*a*, 64*b*, and a feed belt 65. The sheet feed cassette 611, 612 has therein a sheet loading plate for loading a plurality sheets thereon. The sheet loading plate is biased by a spring or a lifting motor in such a manner that an uppermost one of the loaded sheets is brought into contact with the sheet feed roller 621, 622. The resist roller pair 64*a*, 64*b* plays one role of synchronizing between the respective timings of the feeding of a sheet and the transfer of a toner image on the surface of the photosensitive drum 51 in the image forming section 5 and another role of stopping a sheet to adjust the leading end of the sheet and then feeding the sheet to the image forming section 5. The feed belt 65 is operable to feed a sheet having an un-fixed toner image transferred thereon, to the fixing device 7. An appropriate number of feed roller pairs are arranged along the feed path.

The fixing device 7 comprises a first heating roller 71, a first heater 711 embedded in the first heating roller 71, a second heating roller 72, a second heater 721 embedded in the second heating roller 72, and a fixing/discharging roller pair 73*a*, 73*b*. Each of the pair of the heating rollers 71, 72 is made of a material having excellent thermal conductivity, such as aluminum, and coated with fluororesin. The two embedded heaters 711, 721 are operable to control the respective heating rollers 71, 72 to have a temperature required for fixing. The first heating roller 71 is located in opposed relation to the second heating roller 72 in a contact manner at an appropriate pressure, and driven by a driving device (not shown). Each of the heating rollers 71, 72 has a roller body made of a material having excellent thermal conductivity, such as aluminum, and the outer peripheral surface of the body is coated with an elastic layer capable of providing a sufficient nip width for fixing. Each of the heating rollers is provided, but not shown, with a pawl member for releasing a sheet therefrom, and an additional roller and/or web for cleaning the heating roller.

Figure 3:
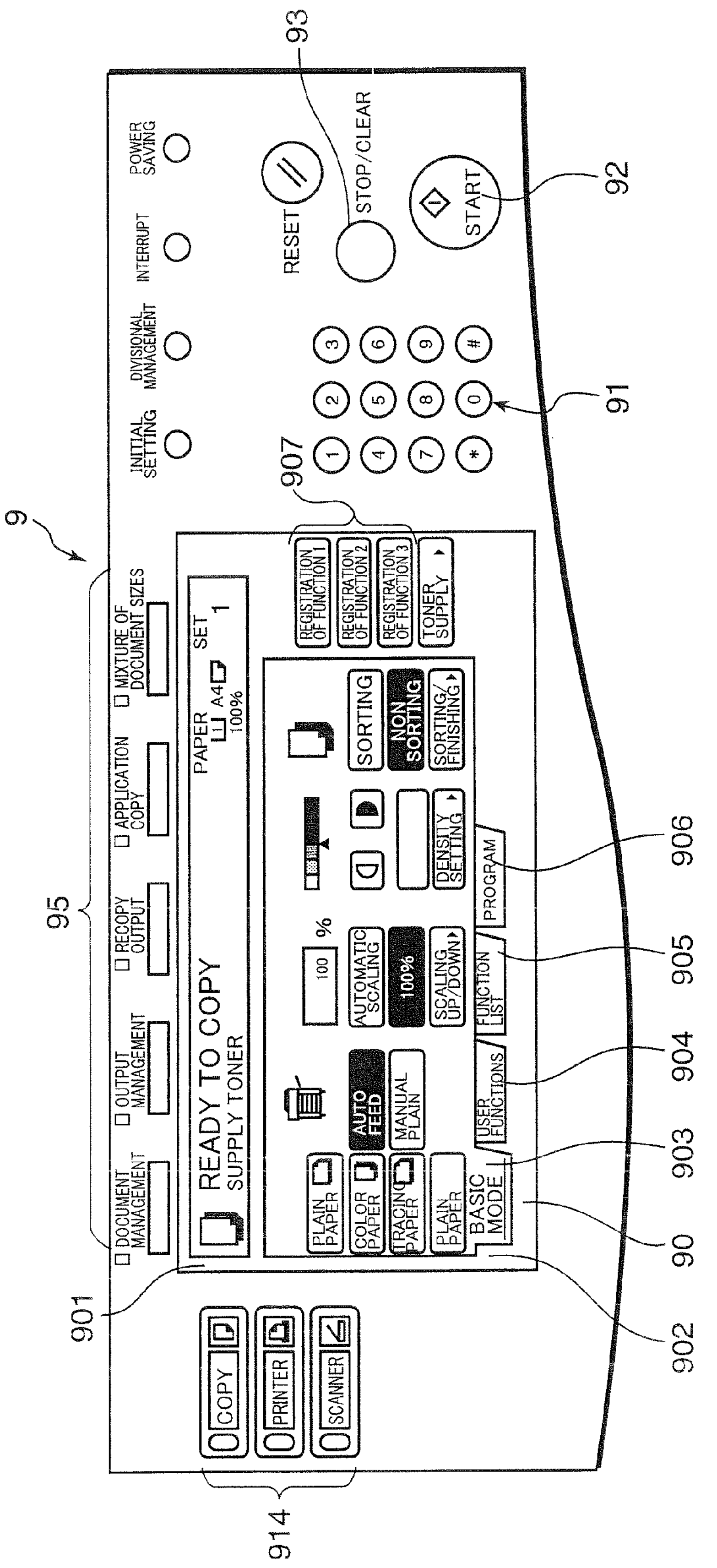
FIG. 3 is a diagram showing the setting-operation unit.

A setting-operation unit 9 of the aforementioned color-image forming apparatus is disposed on the front side of the scanner section 2. As shown in FIG. 3, the setting-operation unit 9 includes a color liquid-crystal display screen (display unit) 90 disposed in the central region thereof, and a basic control key group for a copy job, such as a plurality of numerical-value input keys 91 for setting the number of sheets to be copied, a start key 92 and a clear/stop key 93, which is disposed on the right side of the screen 90. The setting-operation unit 9 further includes a mode display 94 using LEDs to display various modes, such as a copy mode for outputting to a sheet an image read from a document, a printer mode for outputting or printing out to a sheet output-data from a computer connected to a network or the like, and a scanner mode for reading document information, which is disposed on the left side of the screen 90, and various special mode setting keys 95 disposed on the upper side of the screen 90.

Figure 2:
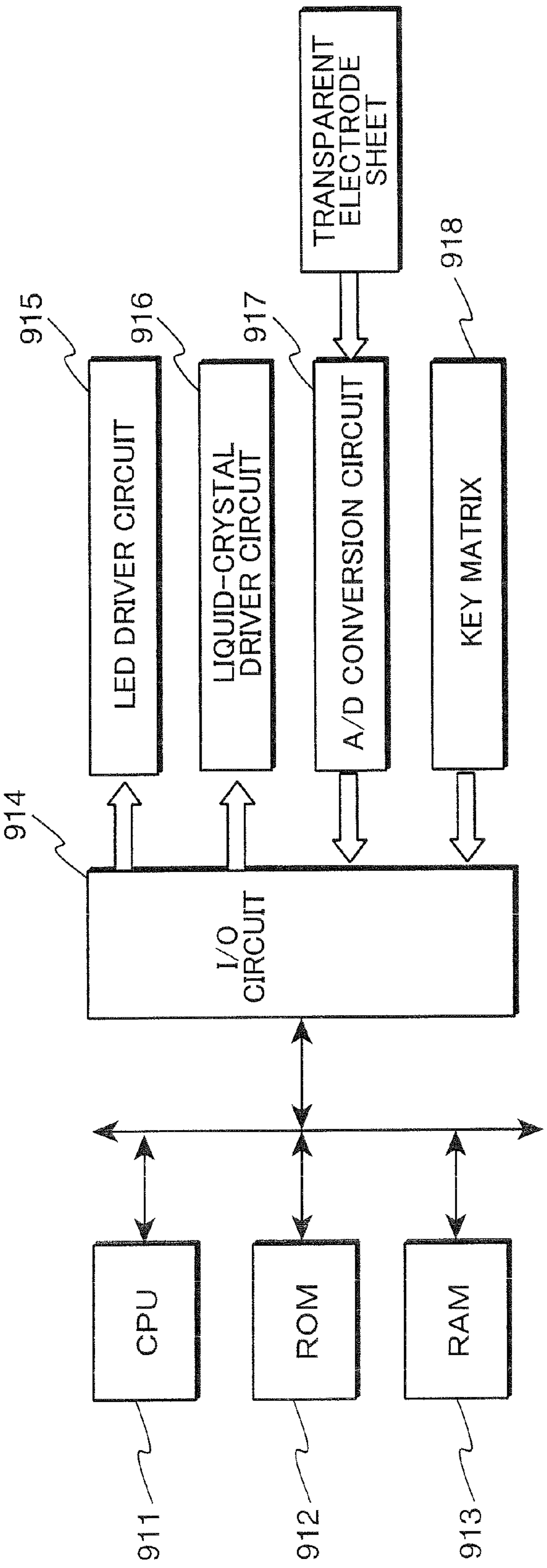
FIG. 2 is a block diagram showing a display control device for a setting-operation unit.

As shown in FIG. 2, a display control device for the setting-operation unit 9 comprises a CPU 911 operable to execute the control of input/output to/from the setting-operation unit 9 and transmit a setup mode to a CPU (not shown) for the aforementioned process control sections, a ROM 912 storing a program to be executed by the CPU 911, a RAM 913 to be used as a working area, an input/output circuit 914, which are connected with each other through an internal bus. The display control device further includes an LED display driver 915, a liquid-crystal driver 916 for controllably driving the color liquid-crystal display screen 90, an A/D conversion circuit 917 for detecting a pressed position of an after-mentioned transparent electrode sheet, and a key matrix input circuit 918 for receiving various key inputs, which are connected to the input/output circuit 914. For example, the A/D conversion circuit 917 and the key matrix input circuit 918 may serve as input unit as set forth in the appended claims. The color liquid-crystal display screen 90 and a combination of the A/D conversion circuit 917 and the key matrix input circuit 918 may be integrally incorporated in a common apparatus, or may be incorporated in individual apparatuses separately. For example, a display unit having the color liquid-crystal display screen 90 and a color-image forming apparatus having the display control device may be prepared separately, and placed at individual remote locations in such a manner that they are connected to one another so as to perform the above display control.

Returning to FIG. 3, the color liquid-crystal display screen 90 is composed of a touch panel-type liquid crystal display unit. The screen 90 has an upper region used as a message display area 901 and a lower region used as a mode setting area 902. The mode setting area 902 is configured to display various setting tab fields consisting of: a basic mode setting tab 903 for setting basic conditions of a copy job, such as scaling factor, sheet size and exposure level; a user function tab 904 for allowing a user to setting/registering functions individually; a function list tab 905 for displaying functional modes of the color copying machine and allowing a user to set one or more of the functional modes; and a program tab 906, and a plurality of function registration keys 907 for allowing a user to register various setup modes individually. The mode setting area 902 is also configured such that when a user manually presses a transparent electrode sheet provided on the surface of the screen 90, the pressed position can be detected. Thus, for example, a sheet-size selection key is composed of a sheet-size selection button displayed on the basic mode setting tab 903, and a corresponding transparent electrode sheet. More specifically, the function list tab 905 is configured such that all of function selection keys, such as a sheet selection key, a copy density key, a document-image-quality key, a sorting key, a both-sided/split key, are displayed when selected, as shown in FIG. 4, and one of the keys can be selectively pressed by a user to shift the list screen to a setting-operation screen for allowing the user to set details of the function corresponding to the selected key.

Figure 4:
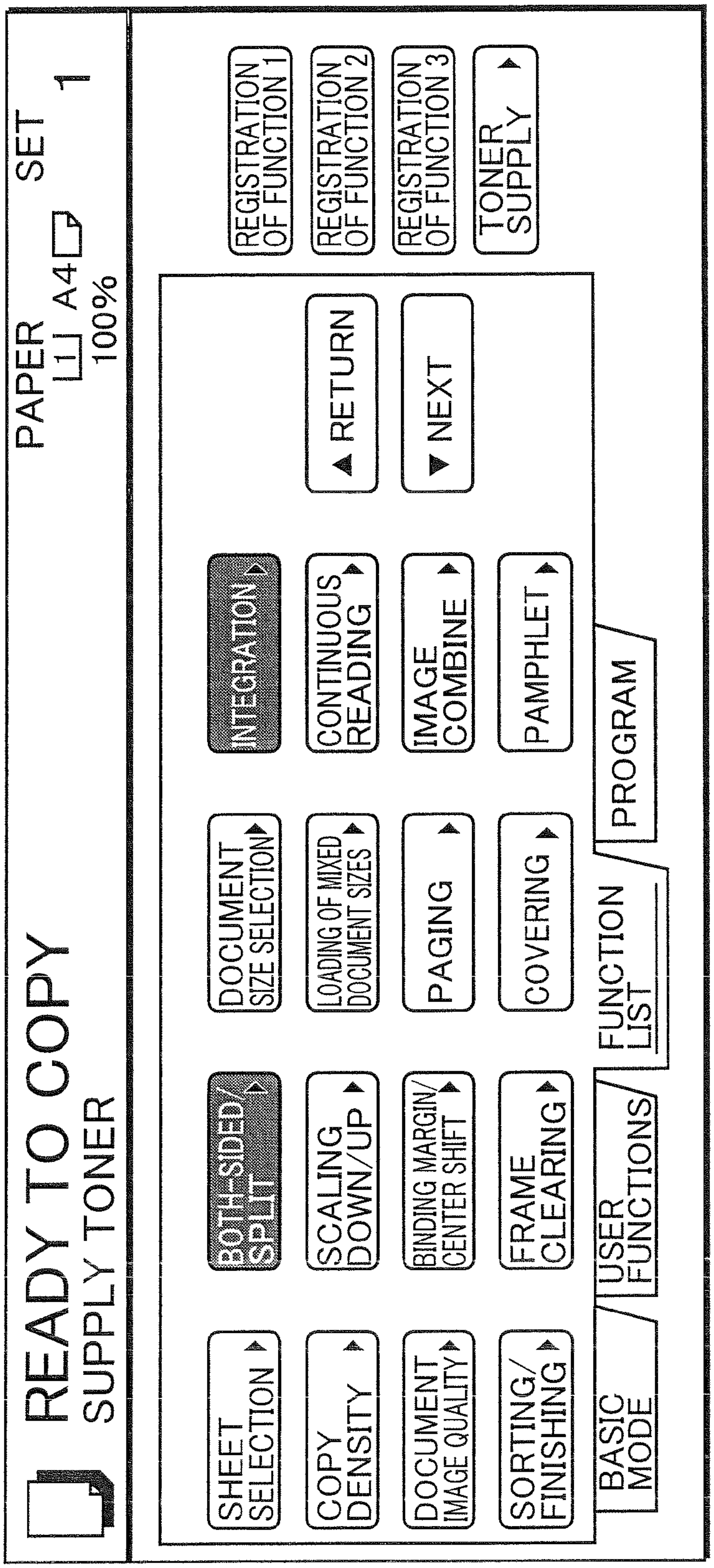
FIG. 4 is a diagram showing a display screen section of the setting-operation unit.
Figure 5A:
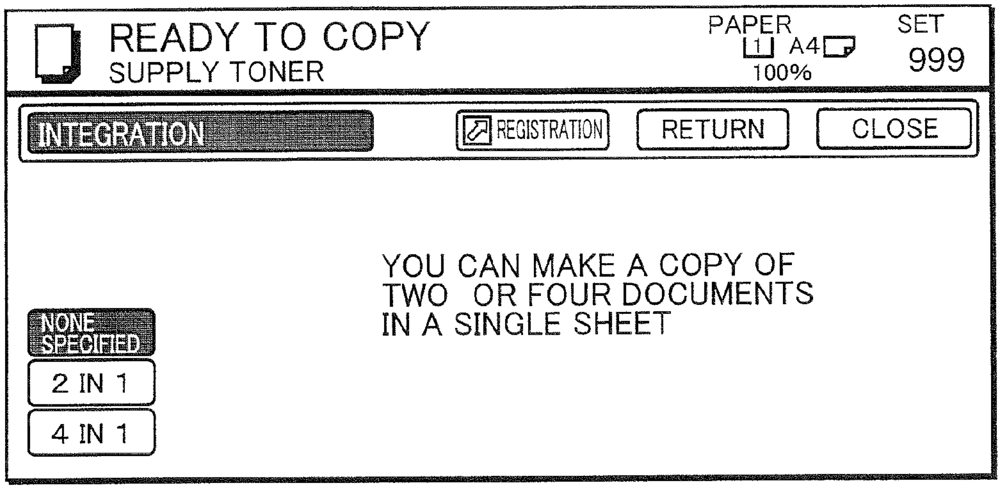
FIGS. 5A, 5B and 5C are diagrams showing the display screen section of the setting-operation unit.
Figure 5B:
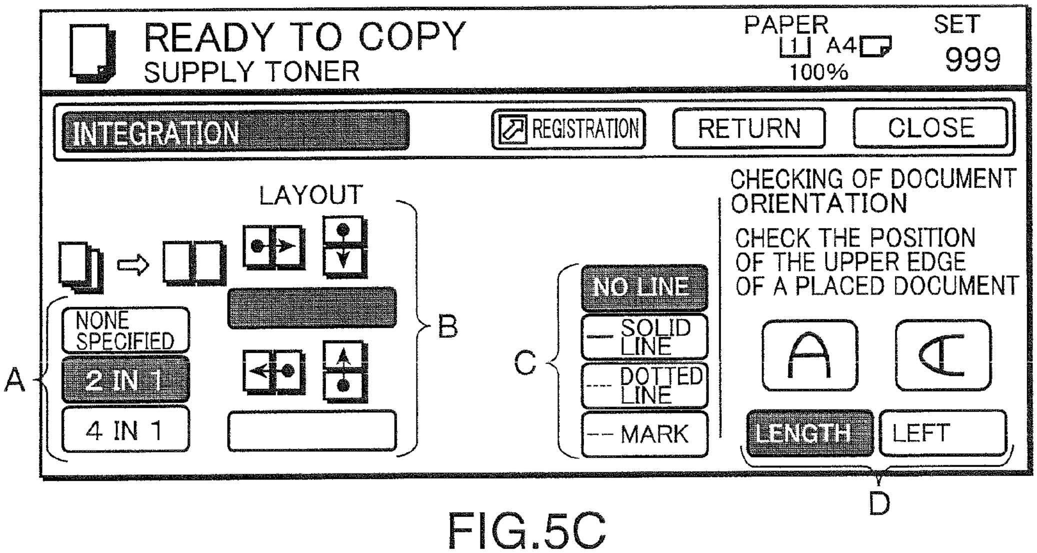
Figure 5C:
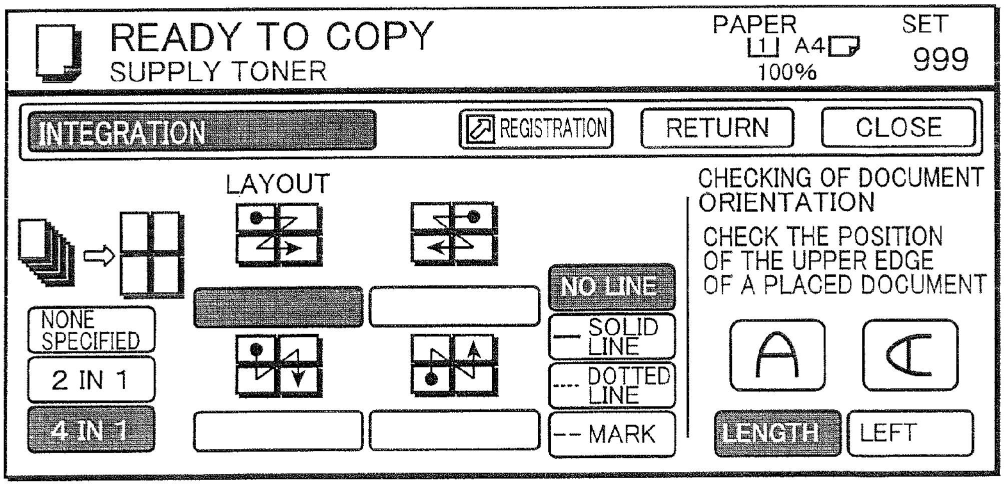

For example, if an "integration" key as shown in FIG. 4 is selected, the list screen will be shifted to a selection screen displaying three keys: a "none specified" key associated with a mode set as an initial or default value, a "2 in 1" key associated with a mode for scaling down two documents to make their copy on a single sheet, and a "4 in 1" key associated with a mode for scaling down four documents to make their copy on a single sheet, as shown in FIG. 5A. A key corresponding to the mode set up by a user's operation (FIG. 5A shows the state after the "none specified" is set up.) is displayed while increasing its brightness. Then, if the "2 in 1" key is selected, the selection screen will be shifted to a screen for setting the output form of the "2 in 1" mode in detail, as shown in FIG. 5B, to allow the user to select one desired form in each of layout, page break and document orientation. After the setting is completed according to the user's intention, the user can operate a "registration" key to register the content of the setting. The user may also operate a "close" key to return the list screen in FIG. 4. Otherwise, if the "4 in 1" key is operated in the selection screen of FIG. 5A, the selection screen will be shifted to a screen for setting the output form of the "4 in 1" mode in detail, as shown in FIG. 5C.

The display control device is configured to count the number of operations of each of keys, for example, in the screen for displaying the function list as shown in FIG. 4, over a given period of time, for example one week or one month, after startup of the device, only if a copy job is initiated in response to the operation of the key, and then store the count data in an operation-record data area provided in the RAM 913. Based on the stored data, the display control device is operable to vary the respective display colors of the display areas for the keys in a stepwise manner using a color gradation from a color with high visibility to a color with low visibility in descending order of the frequency of operation in each of the keys.

Figure 6:
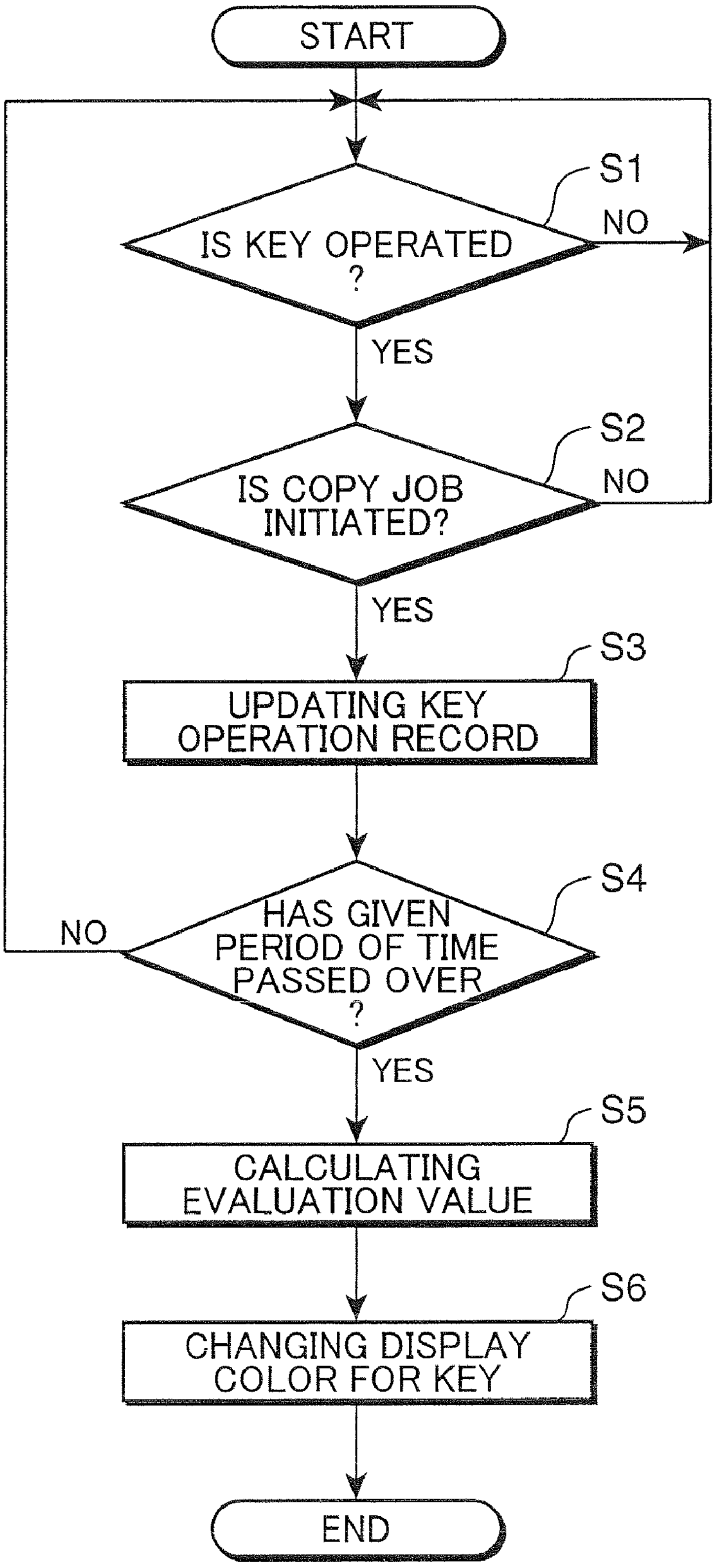
FIG. 6 is a flowchart showing a processing in the display control using a display control device according to one embodiment of the present invention.

This display control processing is executed by the CPU 911. The CPU 911 serves as print-job detection unit, evaluation-value calculation unit and display control unit which are set forth in the appended claims. This display control processing will be described with reference to FIG. 6. When any one, for example the "both-sided/split" or "integration" key, of the keys as shown in FIG. 4 is operated by an operator (YES at Step S1), it is determined whether a copy job is initiated based on the operation of the key (Step S2). When the copy job is initiated based on the key operation (YES at Step S2), this key operation is counted to increase the number of operations (hereinafter referred to as "operation number") of the key by one, and the operation record of this key is updated (Step S3).

The above Steps S1 to S3 are performed for each of the keys displayed on the color liquid-crystal screen 90, until a given period of time (e.g. one week or one month) after startup of the device passes over (No at Step S4). When the given period of time has passed over (YES at Step S4), the difference between the operation number of each of the keys and the lowest operation number of one or more of the keys is calculated as an evaluation value of each of the keys, and the evaluation value of each of the keys is classified into one of a plurality of groups segmented by a plurality of operation number thresholds (Step S5). In other words, it is determined to which of a plurality of groups defined according to the difference in frequency of operation (hereinafter referred to as "operation frequency") each of the keys belongs. Then, the respective display colors of the display areas for the key groups are controllably displayed in such a manner that the color with high/low visibility is allocated to the key groups depending on the operation frequency in each of the key groups (Step S6). For example, the color with highest visibility is allocated to the key groups of most frequent use.

For example, in case where the display colors are varied to have three levels of visibility in a stepwise manner, the keys are displayed while being grouped by "Red", "Orange" and "Yellow" in order of higher score of the evaluation value. This display is applied to a character or text portion for displaying a job instruction to be entered through each of the keys, or a portion displayed as the background of the text portion. If a plurality of keys belong to the same group, the key having the highest evaluation value may be controlled to flicker. The present invention is not limited to the color gradation as in the above embodiment, and any other suitable color gradation varying from a color with high visibility to a color with low visibility in a stepwise manner may be used. Further, the number of the segmented groups is not limited to three.

As the result of the display control processing, if the "integration" key in FIG. 4, for example, has the highest score of the evaluation value, the display color of the "integration" key will be changed to a red color (represented by hatched lines extending obliquely rightward in the upward direction of FIG. 4). Further, if the "both-sided/split" key has the second highest score of the evaluation value, the display color of the "both-sided/split" key will be changed to an orange color (represented by hatched lines extending obliquely leftward in the upward direction of FIG. 4), and the remaining keys will be changed to a yellow color (represented by no hatched line).

In addition, the operation keys in the selection screen to be displayed when each of the function selection keys is operated, such as the aforementioned "none specified", "2 in 1" and "4 in 1" keys, and the operation keys in the lower-level setting screen, such as the "layout", "page break" and "document orientation" keys, may be configured such that the operation number of each of the keys is stored to calculate an evaluation value thereof, and the keys are controllably displayed in the same manner as described above.

In the above embodiment, it is critical to count the operation number of a key only if a copy job has been initiated after the pressing operation of the key, in other words, it is critical to count the operation number of only a key which has issued an instruction specifying the setup content of a copy job, instead of counting the operation number of a key which is simply operated.

Further, when a user pushes a certain button, the display control device is operable to display the pushed button in a higher brightness than those of the display colors controlled in the above manner. This allows the user to readily recognize the pushed button.

The present invention is not limited to the configuration of the above embodiment, but various modifications may be made. For example, the above relative operation number may further be subjected to weighting using a relative operation order so as to calculate an evaluation value. More specifically, the product of the relative operation number and the relative operation order is used as the evaluation value. The relative operation number does not always correspond to the relative operation order. In case where the relative operation order is in a late position while the relative operation number has a high value, if the display colors are determined by an evaluation value derived from only the relative operation number, an operator is likely to take a longer time for the key operation on the contrary. Similarly, in case where the relative operation number has a low value while the relative operation order is in an early position, if the display colors are determined by an evaluation value derived from only the relative operation order, the key operation is likely to be complicated on the contrary. From this point of view, the evaluation value derived in consideration of both the relative operation number and the relative operation order allows users who are inexperienced in the key operation to perform a reasonable setting.

Further, the background color of the display area for a key having a high evaluation value (or, the color of a portion displayed as the background of a text portion for displaying an operational instruction to be entered through the key in the display area for a key having a high evaluation value) may be controllably changed to a complementary color to the background color of the display area for another key. For example, if the background color of all keys is initially "yellow", the background color of the key having the highest evaluation value will be changed to "blue". Thus, during a setting operation, a user can recognize a key to be operated, on the basis of the background color to smoothly perform the setting operation.

Figure 7:
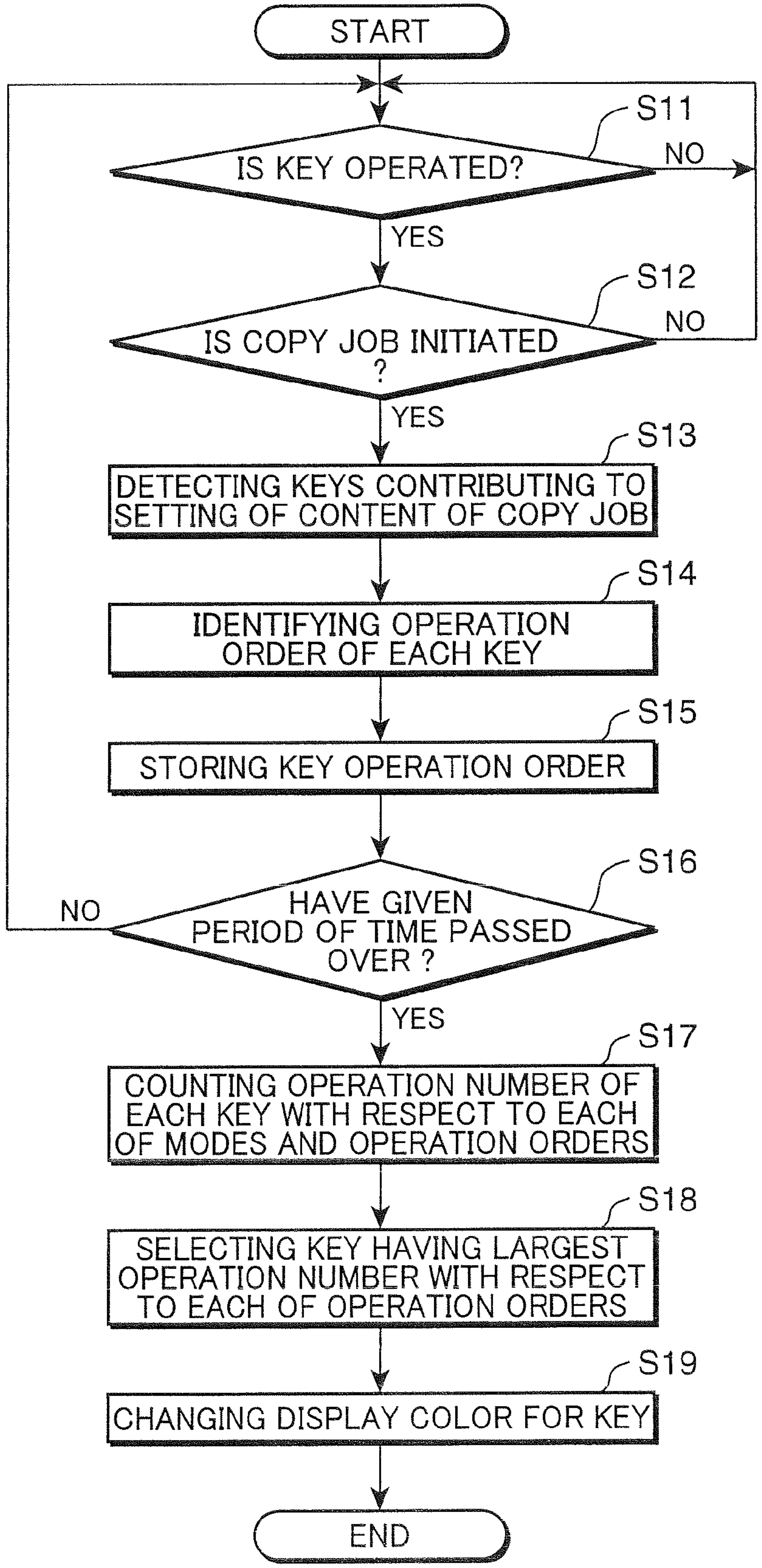
FIG. 7 is a flowchart showing a processing in the display control using a display control device according to another embodiment of the present invention.

With reference to FIG. 5B and a flowchart illustrated in FIG. 7, a display control device according to another embodiment of the present invention will be described in connection with an example in which the display control device is used for an integrative copying. As with the aforementioned embodiment, this display control processing is executed by a CPU 911 as shown in FIG. 2. In this embodiment, the CPU 911 serves as contribution-key detection unit, identification unit, counting unit, selection unit and display control unit which are set forth in the appended claims. A Ram 913 as shown in FIG. 2 serves as operation-order storage unit set forth in the appended claims.

The display screen in FIG. 5B is used to press either one of a group of keys A for setting the type of integration, either one of a group of keys B for setting a layout, either one of a group of keys C for setting the type of line, and either one of a group of keys D for setting the orientation of a placed document. That is, this display screen is configured such that a plurality of keys are displayed in a single display screen, and two or more of the keys are pressed to set the content of a copy job.

When an operator operates two or more of the plurality of keys in FIG. 5B (YES at Step S11), it is determined whether a copy job is initiated base on the operation of one or more of the keys (Step S12). When the copy job is initiated (YES at Step S12), one or more of the operated keys, which have issued an instruction reflected on the setting of the content of the copy job, are detected (Step S13). In other words, only one or more of the keys, which have contributed to the setting of the content of the copy job, are detected while excluding the remaining keys which have been simply pressed as an operation irrelevant to the setting of the content of the copy job.

Then, the operation order of each of the detected keys pressed to set the content of this copy job is identified (Step S14). The identified operation order of each of the key is stored in the RAM 913 every time a copy job is performed (Step S15). These Steps S11 to S15 are repeatedly performed every time a copy job is performed, until a given period of time (e.g. one week or one month) passes over (No at Step S16).

After the given period of time has passed over (YES at Step S16), if the copy job is classified by modes (for example, in FIG. 5A, if the copy job is classified by the "none specified", "2 in 1" and "4 in one" modes in which the copy job has been performed), the operation number of each of the keys is counted with respect of each of the modes and operation orders (Step S17). For example, in case where a plurality of copy jobs are performed in the "2 in 1" mode, the operation number of each of the keys pressed in the first order, the operation number of each of the keys pressed in the second order, - - - , and the operation number of each of the keys pressed in the n-th order are counted.

After the counting, one having the largest operation number among the keys pressed in the first order, one having the largest operation number among the keys pressed in the second order, - - - , and one having the largest operation number among the keys pressed in the n-th order are selected with respect to each of the copy job modes (Step S18).

Then, the respective display colors of the display areas for the keys selected in the respective operation orders are displayed in such a manner that they are varied in a stepwise manner using a color gradation from a color with high visibility to a color with low visibility in descending order of the operation orders (Step S19). The operation order from the first to the second, from the second to the third, etc is called as 'forward order'.

An example will be described in which the screen in FIG. 5B is configured such that when redisplayed as its initial screen, the key for selecting the "2 in 1" copy job mode is displayed in a display color varied relative to other keys (the "none specified" and "4 in 1" keys).

In this case, when the "2 in 1" copy job modes were previously performed, one having the largest operation number among the keys pressed in the first order, one having the largest operation number among the keys pressed in the second order, - - - , and one having the largest operation number among the keys pressed in the n-th order were selected. Then, the respective display colors of the display areas for the selected keys are displayed in such a manner that they are varied in a stepwise manner using a color gradation from a color with high visibility to a color with low visibility in descending order of the operation orders. For example, the "2 in 1" button, the layout button on the upper side of the layout button group, the "no line" button, and the "length" button in the document-orientation button group are displayed in red, orange, yellow, and thin yellow, respectively. Thus, an operator can press the buttons in the order of higher visibility of the display color thereof to set the content of the "2 in 1" copy job mode.

If an operator presses the "none specified" or "4 in 1" key in the screen in FIG. 5B, the CPC 911 is operable to select one having the largest operation number among the keys pressed in the first order, one having the largest operation number among the keys pressed in the second order, - - - , and one having the largest operation number among the keys pressed in the n-th order, in a copy job mode corresponding to the pressed key, and display the selected keys in such a manner that they are varied in a stepwise manner using a color gradation from a color with high visibility to a color with low visibility in descending order of the operation orders.

In the above process, the button pushed by the used is displayed with a higher brightness than those of the display colors controlled in the above manner, so as to allow the user to readily recognize the pushed button.

While the display control processing in the above embodiments are performed in a given period of times after startup of the display control device, the operation unit 9 may be configured to variably change the timing for initiating the given period and/or the time length of the period. Further, while the calculation of the evaluation values or the counting of the operation number and the key selection in the above embodiments, are performed after the lapse of a given period of time, the calculation of the evaluation values or the counting of the operation number and the key selection may be performed every time one copy job is completed. In this case, Step S4 in FIG. 6 or Step S16 in FIG. 7 is omitted.

While the display control device for a touch panel-type setting-operation unit in the above embodiments have been described in connection with an example in which the display control device is incorporated in a copying machine, the present invention is not limited to the example, but may be applied as an display control device for a touch panel-type setting-operation unit in any other suitable image forming apparatus, such as facsimile machines or printers. Furthermore, the display control device of the present invention may be applied to any other suitable electronic apparatus other than the image forming apparatus. In this case, the display control device is operable to reflect conditions set through a series of key operations, to the electronic apparatus.

What is claimed is:

1. An image forming apparatus comprising:

display unit for displaying a plurality of manually operable keys on a display screen;

input unit operable, in response to the operation of at least one of said keys displayed by said display unit, to allow an instruction corresponding to said operated key to be entered therethrough;

print-job detection unit for detecting the execution of a print job in accordance with a content set by an instruction entered from said input unit through the operation of at least one of said keys displayed by said display unit;

evaluation-value calculation unit operable, when the execution of said print job is detected by said print-job detection unit, to calculate an evaluation value representing the operational status of said operated key; and display control unit operable, based on said evaluation value of said key, to vary the respective display colors of the display areas for said plurality of keys in said display unit, in a stepwise manner using a color gradation from a color with high visibility to a color with low visibility in order of higher score of said evaluation value.

2. An image forming apparatus comprising:

display unit for displaying a plurality of manually operable keys on a display screen;

input unit operable, in response to the operation of at least one of said keys displayed by said display unit, to allow an instruction corresponding to said operated key to be entered therethrough;

print-job detection unit for detecting the execution of a print job having a content based on an instruction entered from said input unit through the operation of at least one of said keys displayed by said display unit;

evaluation-value calculation unit operable, when the execution of said print job is detected by said print-job detection unit, to calculate an evaluation value representing the operational status of said operated key; and display control unit operable, based on said evaluation value of said key, to allow the background color of the display area for a first one of said keys which has the higher evaluation value than that of a second one of the remaining keys, to be changed to a different display color from the background color of the display area for said second key, and said evaluation value is derived based on the relative number of operations in each of said keys within a given period of time.

3. The image forming apparatus as defined in claim 1, wherein said evaluation value is derived based on the relative number of operations in each of said keys within a given period of time.

4. An image forming apparatus comprising:

display unit for displaying a plurality of manually operable keys on a display screen;

input unit operable, in response to the operation of at least one of said keys displayed by said display unit, to allow an instruction corresponding to said operated key to be entered therethrough;

contribution-key detection unit operable, in response of the operation of two or more of said keys to set a print job in accordance with an instruction entered from said input unit through said operation, to detect one or more of said operated keys which have made a contribution to the setting of the content of said print job;

identification unit for identifying the respective orders of said detected keys which have been operated to set the content of said print job;

operation-order storage unit for storing said identified orders of said detected keys every time said print job is performed, in accordance with the identification result from said identification unit;

counting unit operable, when said print job belonging to a specific category is performed plural times, to count the number of operations of each of said detected keys with respect to each of the operation orders in accordance with data stored in said operation-order storage unit;

selection unit for selecting one of said detected keys which has the largest number of operations, with respect to each of said operation orders in accordance with the counting result from said counting unit; and display control unit for displaying the respective display colors of the display areas for said selected keys in such a manner that they are varied in a stepwise manner using a color gradation from a color with high visibility to a color with low visibility in forward order of said operation orders.

* * * * *